Sept. 8, 1959 A. J. FELT 2,902,828
VEHICLE BRAKE SAFETY MEANS
Filed Feb. 17, 1958 2 Sheets-Sheet 1
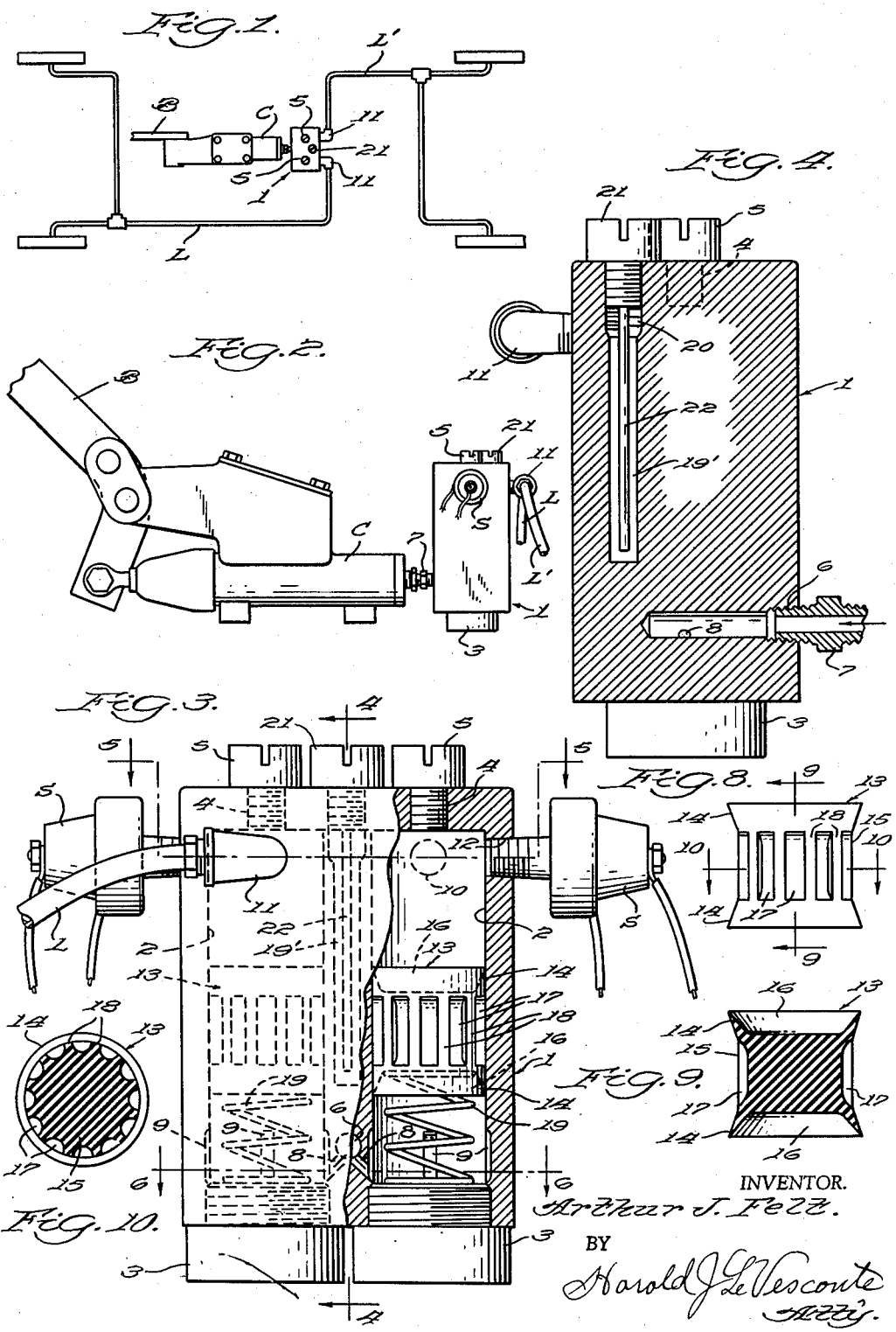
INVENTOR.
Arthur J. Felt.
BY
Harold J. LeVescont
Atty.

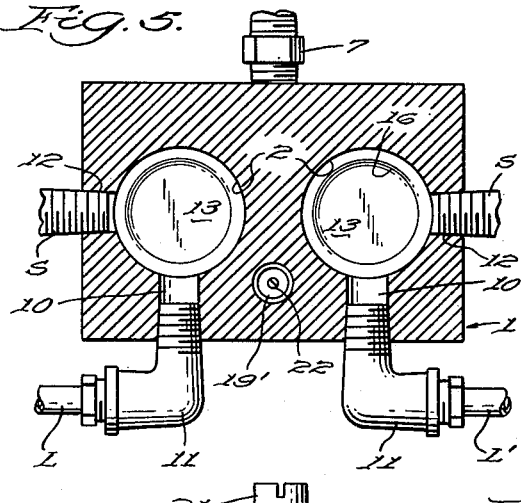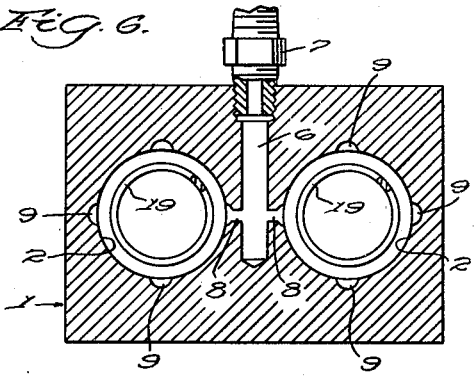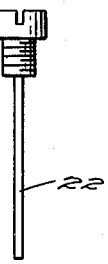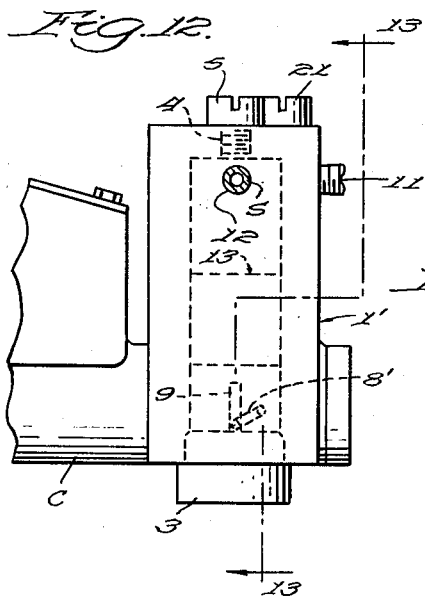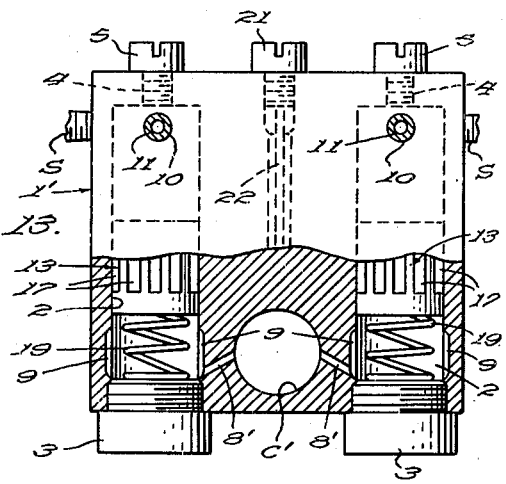

United States Patent Office 2,902,828
Patented Sept. 8, 1959

2,902,828
VEHICLE BRAKE SAFETY MEANS

Arthur J. Felt, Hermosa Beach, Calif.

Application February 17, 1958, Serial No. 715,611

6 Claims. (Cl. 60—54.5)

This invention relates to hydraulic brake equipment for motor vehicles and more particularly to a safety cut-off means effective automatically in the event of leakage in the brake lines or wheel cylinders associated either with a front or rear wheel, to cut off the flow of braking fluid to either both front or both rear wheels so that the vehicle can be operated and controlled by the remaining wheels until it is brought to a garage or other place for repair and service.

Many attempts have been made to achieve this desirable result in the past and, for the most part, such attempts have been accompanied by a secondary cylinder in each brake line including a piston which, upon leakage between it and the wheel cylinder served by the line in which it is located, moves to the end of the cylinder and acts as a shut-off valve to prevent further leakage of fluid therefrom. In refilling the brake lines it is necessary, of course, to exhaust all air from the lines and in most, if not all, of the said prior devices, provision is made for some sort of a valve controlled by-pass channel extending from one end of the safety device cylinder to the other so that, as an incident to filling the system with fluid and evacuating the air therefrom, the fluid could flow through this by-pass channel. After the system was filled, the by-pass channel would be closed by manually operable valve means of some sort and the system was thus rendered operative for use.

Such systems worked satisfactorily and the only real disadvantage with them is that should the by-pass channel not be closed after a filling of the braking system with fluid, the device will not be rendered inoperative and the braking system will operate with the fluid flowing from the master cylinder through the by-pass to the wheel cylinders. However, should a wheel cylinder give out or a brake line be ruptured the entire braking system would be disabled as it would in the event that the safety device were not present. It is with these factors in mind that the principal object of the present invention is to provide a safety cut-off device for a vehicle hydraulic brake system effective in the event of leakage in one portion of a brake system to cut off communications between the master cylinder and that portion of the system, and in which, as an incident to refilling the system with fluid, the device cannot be left in an inoperative condition.

Another object of the invention is to provide a safety cut-off means for hydraulic brake systems for vehicles effective to disable a leaking portion of the vehicle brake system and including for the front and rear wheel brakes, respectively, reciprocable secondary pistons and cylinder and in which the said secondary pistons and cylinders are constructed and arranged to serve as a by-pass for fluid incident to filling the system and the expulsion of air from the system.

Still another object of the invention is to provide a safety cut-off means for vehicle hydraulic brake systems in which the foregoing objectives are realized in practice, which is simple in construction, is readily installed in existing vehicle brake systems, is susceptible of economical manufacture, and is effective for its intended purpose.

A still further object of the invention is to provide a safety cut-off means for vehicle hydraulic systems embodying the aforementioned advantages of the elimination of the separate by-pass means and which can be constructed as an integral part of the vehicle master brake cylinder.

With the foregoing objects in view, together with such additional objects and advantages as may subsequently appear, the invention resides in the parts, and in the construction, combination and arrangement of parts described, by way of example, in the following specification of certain presently preferred modes of execution of the invention; reference being had to the accompanying drawings which form a part of said specification and in which drawings:

Fig. 1 is a schematic view of a vehicle hydraulic brake system including a master cylinder and showing the present invention interposed between the master cylinder and the vehicle brakes, Fig. 2 is an enlarged side elevation of a vehicle master cylinder with the safety cut-off device of the present invention interposed between the master cylinder and the lines leading to the wheel brakes, Fig. 3 is a side elevational view, partly in section and in greatly enlarged scale, taken as viewed from the right hand side of Fig. 2, Fig. 4 is a medial sectional view taken on the line 4—4 of Fig. 3, Figs. 5 and 6 are respectively sectional plan views taken respectively on the staggered line 5—5 and on the line 6—6 of Fig. 3, Fig. 7 is a slightly reduced scale side elevational view generally similar to the right hand side of Fig. 3, but showing the manner in which the by-passing of fluid around the piston is accomplished incident to filling the brake system, Fig. 8 is a side elevation of one of the pistons of the device, Figs. 9 and 10 are, respectively, sectional views taken on the line 9—9 and 10—10 of Fig. 8, Fig. 11 is a piston positioning element employed in positioning the piston for by-passing fluid, the use thereof being shown in Fig. 7, Fig. 12 is a fragmentary side elevation of a master cylinder showing the device of the present invention incorporated therewith as an integral part of the master cylinder frame casting, and Fig. 13 is a fragmentary sectional view taken on the staggered line 13—13 of Fig. 12.

Referring first to the form of the invention shown in Figs. 1 through 11, the device comprises a base member 1 having a pair of parallel cylindrical bores 2 formed therein and extending upwardly from the lower face thereof; said bores at their lower ends being closed by screw plugs 3, 3 and at their upper ends having ports 4, 4 normally closed by screws 5, 5. One side face of the base member 1 in the vertical center line thereof, and adjacent the lower end thereof is provided with a horizontally extending inlet port 6 adapted to be connected by a suitable fitting 7 to the master cylinder C of a brake system, said inlet port having laterally downwardly extending passages 8, 8 each of which communicates with one of a series of vertical channels 9 formed in the walls of the cylinders adjacent the lower ends thereof (see Fig. 6). The base member 1 adjacent its upper end and on the face thereof opposite the face from which inlet port 6 extends, is provided with outlet ports 10, 10 which threadedly receive fittings 11, 11 which at their other ends are connected to the lines L and L' leading respectively, to the front wheels and rear wheels of the vehicle. The ends of the base member 1 adjacent the upper ends of the cylinders are also provided with threaded ports 12, 12 which threadedly receive the usual pressure switches S, S which operate to control the appropriate signal lights of the vehicle. It will be understood, of course, that, if desired, the lines L and L' may be connected to the ports 12, 12 with the pressure switches disposed in the ports 10, 10 or that the pressure switches may if desired be located on the opposite side face of the base member 1, it being necessary only that the said lines and pressure switches have communication with the upper ends of the cylinders 2, 2.

Freely reciprocable in each of the cylinders 2, 2 is one of a pair of piston elements 13 best shown in Figs. 3, 7, 8, 9 and 10. Each piston is formed as a resilient rubber plug having a body diameter closely fitting side walls of the cylinder and, at each end thereof, having integral, pressure responsive sealing means comprising annular, sharp-edged flange portions 14, 14 which normally project outwardly beyond the plane of the body portion 15 and which, incident to the insertion of the piston in the cylinder, are compressed into alignment with the periphery of the body portion 15 with the said flanges forming opposed frusto-conical recesses 16, 16 in the opposite ends of the piston elements. The outer surface of the body portion 15 of the pistons is provided with a series of grooves 17, extending parallel to the axial line of the piston element and said grooves being of greater length than the channels 9 in the cylinder walls and being sufficiently closely spaced so that the lands 18 between adjacent grooves are of lesser width than the channels 9.

A compression spring 19 having one end resting on the closure plug 3 of the cylinder and the other end disposed in the recess 16 at the lower end of the piston normally maintains the piston in a position in the cylinder in which the grooves 17 thereof are out of communication with the channels 9 in the cylinder wall.

With the device installed as shown in Fig. 1 and assuming that all of the lines and the cylinders are filled with fluid and that all air has been expelled from the system, it is obvious that upon the application of braking pressure through actuation of the brake pedal B, fluid entering the port 6 and thence reaching the lower ends of the cylinders 2, 2 will move the pistons 13, 13 upwardly in their respective cylinders with resultant expulsion of fluid through the lines L and L' and consequent application of braking pressure on the wheels. Should the brake system develop a leak either in one of the lines L or L' or in one of the brake cylinders, the said upward movement of the piston in the cylinder connected to the leaking portion of a brake system will continue until the upper end of the piston extends across the port 10 thereof shutting off the further flow of fluid. In this connection it is particularly to be noted that the flange ends 14 at the lower ends of the piston prevents the leakage of any fluids past the piston. While the one portion of the brake system is thus disabled, the other portion will continue to remain operative to control the vehicle until a point can be reached at which the cause of the disability can be repaired.

After the defect has been repaired and it is desired to refill the brake system or at least the portion thereof affected by the disability, the closure screw 5 of the cylinder 2 connected to the portion of the brake cylinder system to be refilled is removed. The base member is provided with a bore 19' leading downwardly from the upper surface thereof and having a threaded portion 20 at the upper end thereof provided with the same threads as the threads of the ports 4, said bore 19' serving as a housing for retaining a screw-threaded element 21 having at the distal end thereof a rod portion 22. Screw element 21 is then inserted in place of the removed screw 5 and is pressed downwardly until the threads thereof engage the threads of the port 4 and it is screwed into place. Incident to so doing the rod portion 22 thereof will engage and press the piston element 13 downwardly against the opposition of the spring 19 (see Fig. 7) and to a point at which the lower end of the grooves 17 thereof are below the upper ends of the channels 9 in the cylinder wall. The length of the channels 9 is such that they extend above the lower ends of the grooves 17 when in this position but do not extend above the upper end of the piston. Since the lands 18 between the adjacent grooves 17 are of less width than the channels 9, regardless of the rotative position of the pistons in the cylinders 2, communication will be established between the lower end of the cylinder and the ones of the grooves 17 which happen to be in communication with the channels 9 with the result that upon the application of pressure on the fluid by the master cylinder, said fluid will be forced past the portion flange 14 at the upper end of the piston and the fluid is thus supplied until the brake lines and brake cylinders have all been filled and cylinder 2 is likewise filled. The screw element 21 is then removed and the spring 19 then moves the piston upwardly in cylinder 2 to the extent of the normal length of the spring with consequent expulsion of fluid through the port 4 and incidentally, expelling any air that has been trapped in the upper end of the cylinder 2. The screw 5 is then replaced to seal the end of the cylinder and the screw element 21 is replaced in its receiving bore 19' to be kept there until it is again required to be used.

It is particularly to be noted in this connection that the filling of the piston including the upper end of the cylinder 2 and the brake lines and brake cylinders connected thereto, cannot be achieved without first positioning the piston as shown in Fig. 7. When it is so positioned the flow of fluid past the piston is so slow and difficult as to make the action of the brakes on the wheels affected thereby at least sluggish and difficult to operate, and therefore indicative that something is wrong. Investigation would then disclose the fact that the screw element 21 is missing from its socket and it would follow as a matter of course that it is positioned in one or the other of the ports 4. Thus it is that the present invention achieves the desirable objective that any by-passing of the shut-off piston device by a separate channel which could be accidentally left open is avoided, and that whenever it is necessary to fill the system, means is provided which permits the system to be filled by by-pass means disposed entirely in the piston and cylinder and which means, if left in by-passing position accidentally, will instantly reveal to the operator that something is wrong with the brakes and also reveal upon examination what has caused the trouble without actually disabling the brake means.

Referring finally to Figs. 12 and 13 there is shown a modified form of the invention in which the base member is formed as an integral part of the master cylinder casting C, the base member portion of the present invention being designated as 1'. Passages 8' (see Fig. 13) connect the interior of the master cylinder C' with the channels 9 at the lower end of the auxiliary cylinders 2, 2. The remainder of the invention is exactly the same as heretofore described wherefore the same numbers have been applied. The action of the device is exactly the same as in the first-described form of the invention and the mode of refilling the cylinders therefor is also the same as heretofore described, wherefore repetition of that operation is deemed unnecessary.

While in the foregoing specification there has been disclosed certain presently preferred modes of execution of the invention, it is not to be inferred therefrom that the invention is limited to the forms thereof above disclosed by way of example, and it will be understood that the invention embraces all such changes and modifications in the parts and in the construction, combination and arrangement of parts as shall come within the purview of the appended claims.

I claim:

1. A safety device for use with a hydraulic brake system for vehicles of the type comprising a master cylinder connected by one fluid conduit means to the brake devices of the front wheels and by another fluid conduit means to the brake devices of the rear wheels of the vehicle; said safety device comprising a pair of enclosed cylinders each having an inlet port adapted to be connected to receive fluid under pressure from the master cylinder and each having an outlet port adapted to be connected one each to each of said fluid conduit means and each of said cylinders having a freely reciprocable piston therein and a spring means for normally moving the piston toward the outlet port of the cylinder, each of said pistons at each end thereof having pressure responsive sealing means effective to prevent the entry of fluid between the piston and the cylinder wall, and means carried by said pistons and said cylinders and including manually operable means for positioning said pistons adjacent to the inlet ports in said cylinders effective to disable the sealing effect of the sealing means at the ends of the pistons adjacent to the inlet ports with consequent capacity of the safety device to allow fluid to be conducted past the pistons to the outlet port end of the cylinders incident to filling the system with fluid and expelling air therefrom, said pistons, when released from the said positioning by said manually operable means, being effective normally to transmit braking effort from fluid entering said inlet ports to fluid at the other end of the cylinders for brake operation and in the presence of a leak downstream of the outlet ports thereof to move to the outlet port end of the cylinder and close the outlet port against further escape of fluid; each of said pistons comprising a cylindrical, resilient element closely frictionally engaging the wall of the cylinder and, further, having integral resilient annular flanges at each end thereof constituting said sealing means.

2. A vehicle brake safety device as claimed in claim 1 in which each of said pistons comprises a cylindrical, resilient element having integrally formed sealing means at each end thereof and in which said cylinders have each at least one channel extending longitudinally from the inlet port end thereof toward the opposite end for a distance which is greater than the length of the sealing means on the adjacent end of the piston and less than the distance to which the piston is normally moved by said spring means and in which the outer surfaces of said pistons between the said sealing means at each end, include longitudinally extending grooves spaced apart laterally by lands of less width than said channel.

3. A vehicle brake safety device as claimed in claim 2 in which said spring means comprises a pair of compression springs disposed one each in each of said cylinders between the inlet port and the piston, each of said springs having an extended length sufficient to move the piston to about the mid-length of the cylinder and being sufficiently compressible to allow the piston to be moved in opposition thereto to a position adjacent to said inlet port of the cylinder with said grooves and said channel disposed in overlapping relation.

4. A safety device for use with the hydraulic brake system of a vehicle of the type comprising a master cylinder and fluid conduit means separately connecting the master cylinder to the braking devices of the front and rear wheels and adapted to be interposed between the master cylinder and the fluid conduit means and being effective in event of a leak downstream therefrom to prevent flow therethrough, said safety device comprising a body member having a pair of cylinders formed therein and each having an inlet port at one end and an outlet port at the other end thereof connected to the respective fluid conduit means, an inlet port in said body member establishing communication between the master cylinder and the inlet ports of said pair of cylinders, each of said pair of cylinders having a freely reciprocable piston therein and a spring means normally moving the piston toward the outlet port of the cylinder, each of said pistons at each end thereof having integrally formed, flexibly resilient pressure responsive sealing means rendered effective by imposition of fluid pressure to prevent fluid from entry between the piston and cylinder wall, and means carried by said pistons and said cylinders including manually operable means for so positioning said pistons individually in said cylinders as to disable the sealing effect of the sealing means at the ends of said pistons adjacent the inlet port with consequent capacity of the safety device to by-pass fluid between the piston and cylinder wall incident to filling the system with fluid and expelling air therefrom, said pistons, in normal use of the device, being effective normally to transmit braking effort from fluid entering the inlet port to fluid at the other end of the cylinder and in the presence of a leak in the fluid conduit means served thereby to move to the outlet port end of the cylinder and close the said outlet port thereof.

5. A vehicle brake safety device as claimed in claim 4 in which each of said pistons comprises a cylindrical resilient element closely frictionally engaging the wall of the cylinder and further having integral annular flanges projecting beyond each end thereof and constituting said sealing means.

6. A safety device for hydraulic brakes for vehicles comprising a pair of cylinders each having one end thereof adapted to be connected to the output end of the master cylinder of the vehicle and having the opposite ends thereof adapted to be connected, respectively, to lines leading to the front and rear wheel brakes and each of said cylinders having a freely reciprocable piston therein and each of said pistons at each end thereof having integrally formed, pressure responsive, flexibly resilient sealing means effective to prevent the movement of fluid past said sealing means and thence between the piston and the cylinder wall, each of said cylinders and the piston therein having means for intentionally passing fluid past the piston from the master cylinder connected end thereof to the opposite end of the cylinder, said means comprising at least one groove in the cylinder wall extending from the master cylinder connected end thereof toward the opposite end thereof for a distance less than the length of the piston and substantially greater than the length of the sealing means at the end of the piston adjacent to said master cylinder connected end, spring means interposed between the piston and the master cylinder connected end of the cylinder normally effective to maintain said piston out of communication with said groove, a plurality of grooves extending between said sealing means on said piston, a port at the end of said cylinder opposite the master cylinder connected end thereof, a screw normally closing said port, and means carried by the side wall of the cylinder exteriorly of the interior of the cylinder usable as a replacement of said screw operable to move said piston against the bias of said spring into a position in which said channel and at least one of said grooves are in communication with each other with resultant capacity of said cylinder and piston to allow the passage of fluid past said piston incident to filling the system and expelling air therefrom, said piston normally having capacity to move in said cylinder from the position therein established by said spring to the brake cylinder connected end of the cylinder in the event of leakage and to thereafter prevent the loss of fluid from the system.

References Cited in the file of this patent

UNITED STATES PATENTS

| 1,724,881 | Lund | Aug. 13, 1929 |
| 2,539,970 | Pollard et al. | Jan. 30, 1951 |

FOREIGN PATENTS

| 697,509 | Great Britain | Sept. 23, 1953 |